US009594700B2

(12) United States Patent
Dally

(10) Patent No.: US 9,594,700 B2
(45) Date of Patent: Mar. 14, 2017

(54) SPECULATIVE MEMORY CONTROLLER

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 400 days.

(21) Appl. No.: 13/865,136

(22) Filed: Apr. 17, 2013

(65) Prior Publication Data

US 2014/0317361 A1 Oct. 23, 2014

(51) Int. Cl.
*G06F 12/10* (2016.01)
*G06F 13/16* (2006.01)

(52) U.S. Cl.
CPC .................................. *G06F 13/161* (2013.01)

(58) Field of Classification Search
CPC ... G06F 13/18; G06F 12/1408; G06F 12/0246
USPC .......................................................... 711/158
See application file for complete search history.

(56) References Cited

U.S. PATENT DOCUMENTS

2010/0191916 A1* 7/2010 Balakrishnan et al. ...... 711/134

OTHER PUBLICATIONS

Rixner, S. et al., "Memory Access Scheduling," ACM, 2000, pp. 128-138.
Dally, W. J., U.S. Appl. No. 13/688,170, filed Nov. 28, 2012.

* cited by examiner

*Primary Examiner* — Jae Yu
(74) *Attorney, Agent, or Firm* — Zilka-Kotab, PC

(57) ABSTRACT

A method and a system are provided for controlling memory accesses. Memory access requests including at least a first speculative memory access request and a first non-speculative memory access request are received and a memory access request is selected from the memory access requests. A memory access command is generated to process the selected memory access request.

19 Claims, 8 Drawing Sheets

SPECULATIVE MEMORY CONTROLLER

FIELD OF THE INVENTION

The present invention relates to circuits, and, more specifically to memory controller circuits.

BACKGROUND

A memory controller receives read and write memory requests and in response issues row activate, row precharge, column read, and column write commands to a memory device, such as a dynamic random access memory (DRAM). To maximize memory bandwidth, conventional memory controllers group requests that access the same memory bank, so that the latency incurred for the row precharge and activate operation to access the particular bank is amortized over several accesses. When memory accesses are less frequent, the latency incurred by each access may increase, and processing performance may suffer.

There is thus a need for addressing these and/or other issues associated with the prior art.

SUMMARY

A method and a system are provided for controlling memory accesses. Memory access requests including at least a first speculative memory access request and a first non-speculative memory access request are received and a memory access request is selected from the memory access requests. A memory access command is generated to process the selected memory access request.

DETAILED DESCRIPTION

Memory access latency is a critical factor in determining the performance of a computer system. Memory access latency can be reduced if the time required to synchronize memory requests from the processor clock domain to the memory clock domain can be reduced. One approach to reducing synchronization time involves speculatively synchronizing a request. A synchronizer may provide a speculative request with low latency and later, the synchronizer either validates or recalls the request. Recalled requests are typically replaced with a correctly synchronized request. A conventional memory access request (read or write) is a non-speculative memory access request because the memory access request should always be completed. A speculative memory access request should not always be completed. Moreover no irreversible operations should be performed for a speculative request—because the speculative request may later be recalled by the synchronizer.

Some time after a speculative memory access request is received by the memory controller, the speculative memory access request will either be validated or recalled. Recalled speculative memory access requests should not be completed and are discarded by the memory controller. Validated memory requests should be completed and are converted to non-speculative memory access requests. The memory controller avoids performing irreversible operations for a speculative memory access request until the speculative memory access request is validated. Therefore, the memory controller may select non-speculative memory access requests and may perform memory operations to advance speculative memory access requests to minimize latency and maximize throughput of the memory access requests. Memory operations can be performed to advance speculative memory access requests as long as those memory operations are not irreversible. For example, the memory controller may be configured to advance a speculative memory write request by performing reversible precharge and row activate operations, but the memory controller may not perform an irreversible column write operation until the speculative memory write request has been validated.

Figure 1:
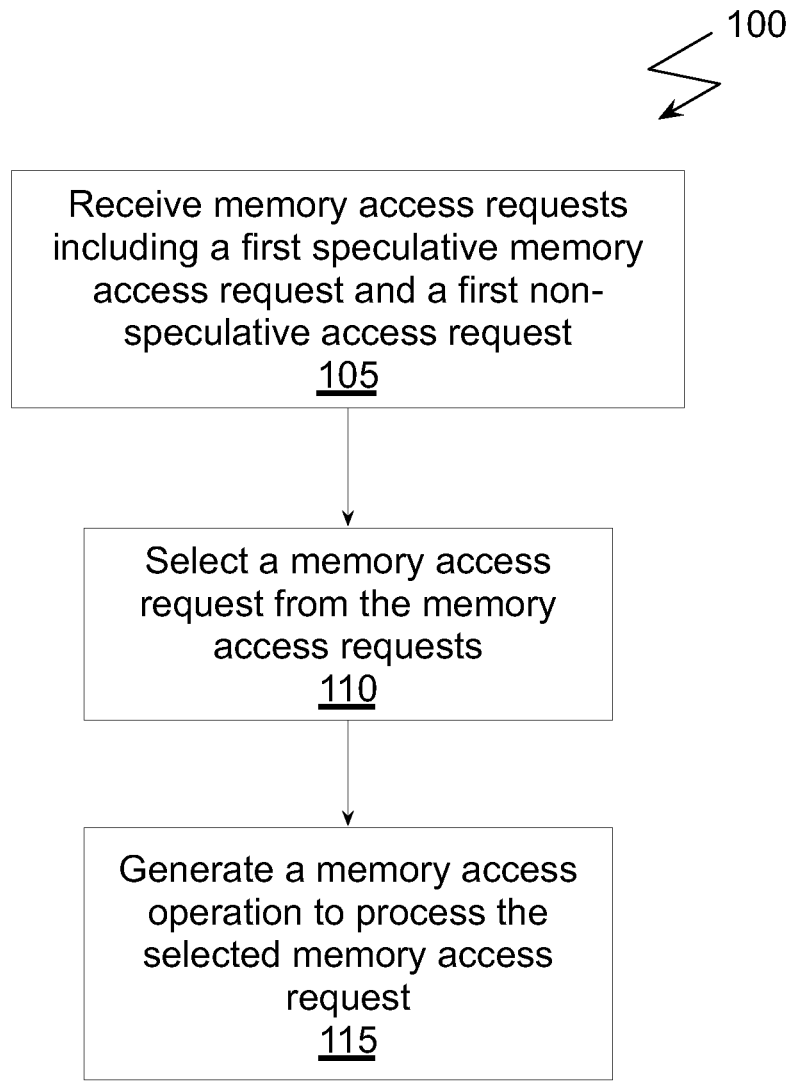
FIG. 1 illustrates a flowchart of a method for controlling memory accesses, in accordance with one embodiment.

FIG. 1 illustrates a flowchart of a method 100 for controlling memory accesses, in accordance with one embodiment. At operation 105 memory access requests including at least a first speculative memory access request and a first non-speculative memory access request are received. A speculative memory access request may be configured to perform a read or write access that will be either recalled (cancelled) or validated and converted to a non-speculative memory access request. Performing a speculative read access is not problematic except that a speculative read request that is performed and is later cancelled consumes memory bandwidth. However, performing a speculative write access is problematic if the speculative write access request is later cancelled. A speculative write access is an irreversible operation at the point when the write data is stored in the memory. At operation 110, a memory access request is selected from the memory access requests. At operation 115 a memory access command is generated to process the selected memory access request.

More illustrative information will now be set forth regarding various optional architectures and features of a speculative memory controller. It should be strongly noted that the following information is set forth for illustrative purposes and should not be construed as limiting in any manner. Any of the following features may be optionally incorporated with or without the exclusion of other features described.

Figure 2A:
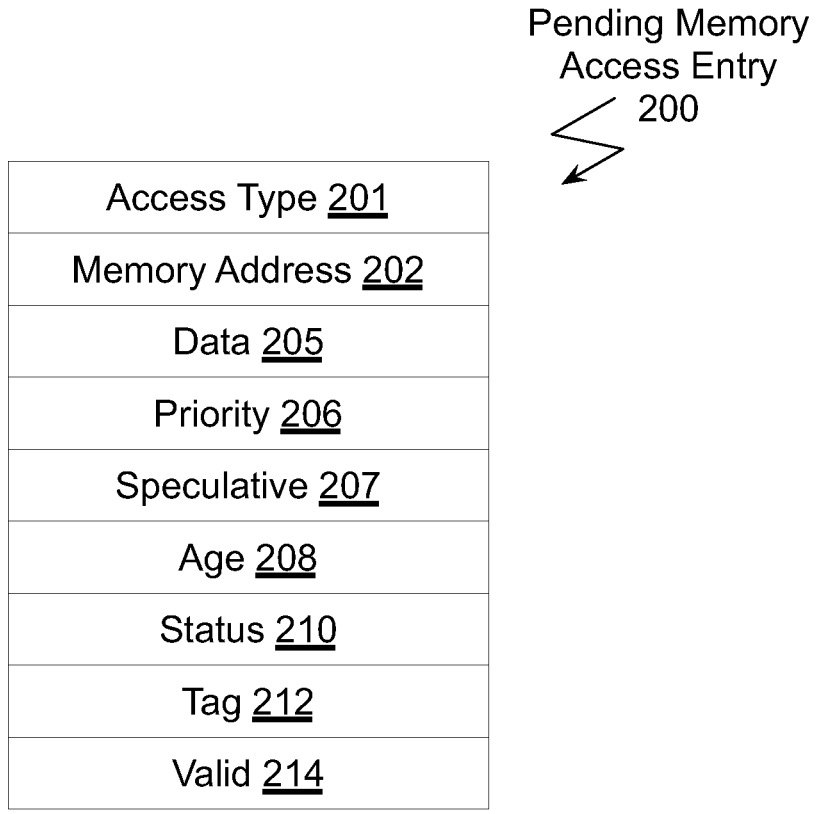
FIG. 2A illustrates a pending memory access entry, in accordance with one embodiment.

FIG. 2A illustrates a pending memory access entry 200, in accordance with one embodiment. Each memory access request that is received by the speculative memory controller is stored in a pending memory access entry 200. The pending memory access entry 200 includes several different fields for storing information specific to the memory access request and tracking the state of the memory access request. The access type 201 field indicates whether the memory access request is a read access or a write access. The memory address 202 field stores the memory address for the memory access request. The data 205 field stores the data for the memory access request when the access type is write and stores data read from the memory (to be returned to the initiator of the request) when the access type is read. The priority 206 field stores a priority for the memory access request. In one embodiment, the priority field is two bits where a value of 0 represents the lowest priority and a value of 3 represents the highest priority. The priority may be used by the speculative memory controller to select a memory access request.

The speculative 207 field indicates whether the memory access request is speculative or non-speculative (i.e., TRUE=speculative). The age 208 field stores an age indication for the memory access request. The age indication may be a timestamp indicating when the memory access request was received by the speculative memory controller. The status 210 field stores status information for the memory access request. A memory access request may be in one of several states, as described in conjunction with FIG. 2C, and the status is related to the state. In one embodiment, the status 210 field may be "initial", "precharge requested", "precharged", "row requested", "row ready", "column requested", and "done".

The tag 212 field stores information corresponding to the initiator of the memory access request that is used to return a reply to the initiator when the processing of the memory access request is completed. The valid 214 field indicates whether a pending memory access request is stored in the pending memory access entry 200. When the memory access request is either recalled or completed, the valid 214 field is updated to free the pending memory access entry 200 for use by a new memory access request. When a new memory access request is stored in the pending memory access entry 200, the fields are updated according to the new memory access request.

When the speculative memory controller selects a memory access request for processing, one or more fields in one or more of the pending memory access entries 200 are updated. The speculative memory controller outputs commands to the memory to precharge a row, activate a row, and enable a column to perform a read or write access. As each command is processed the status 210 field for one or more pending memory access entries 200 is updated.

Figure 2B:
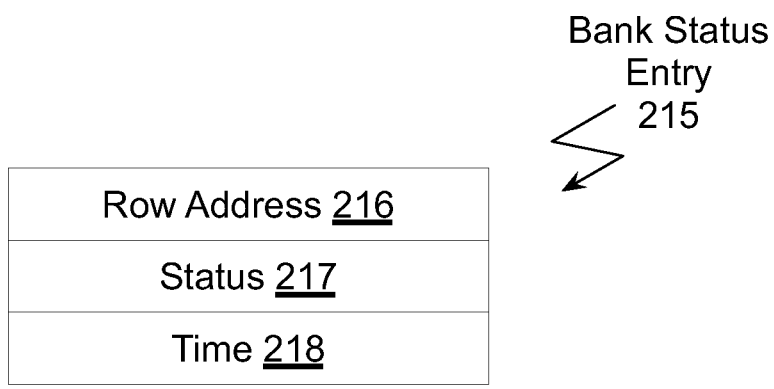
FIG. 2B illustrates a memory bank status entry, in accordance with one embodiment.

FIG. 2B illustrates a memory bank status entry 215, in accordance with one embodiment. The speculative memory access controller maintains a bank status entry 215 for each memory bank. The information stored in the bank status entries 215 may be used by the speculative memory access controller to select a memory access request for processing.

The row address 216 field stores the row address for the memory bank. The status 217 field stores an indication of the bank status, such as "open", "closed", "pending open", "pending closed". The status 210 fields of the pending memory access requests may be updated according to the status of the bank which each pending memory access request will access when a bank is opened or closed. The time 218 field indicates the time (in clock cycles) until the bank will be open for a bank having a status of "pending open" and the time until the bank is precharged for banks having a status 217 field set to "pending closed".

Figure 2C:
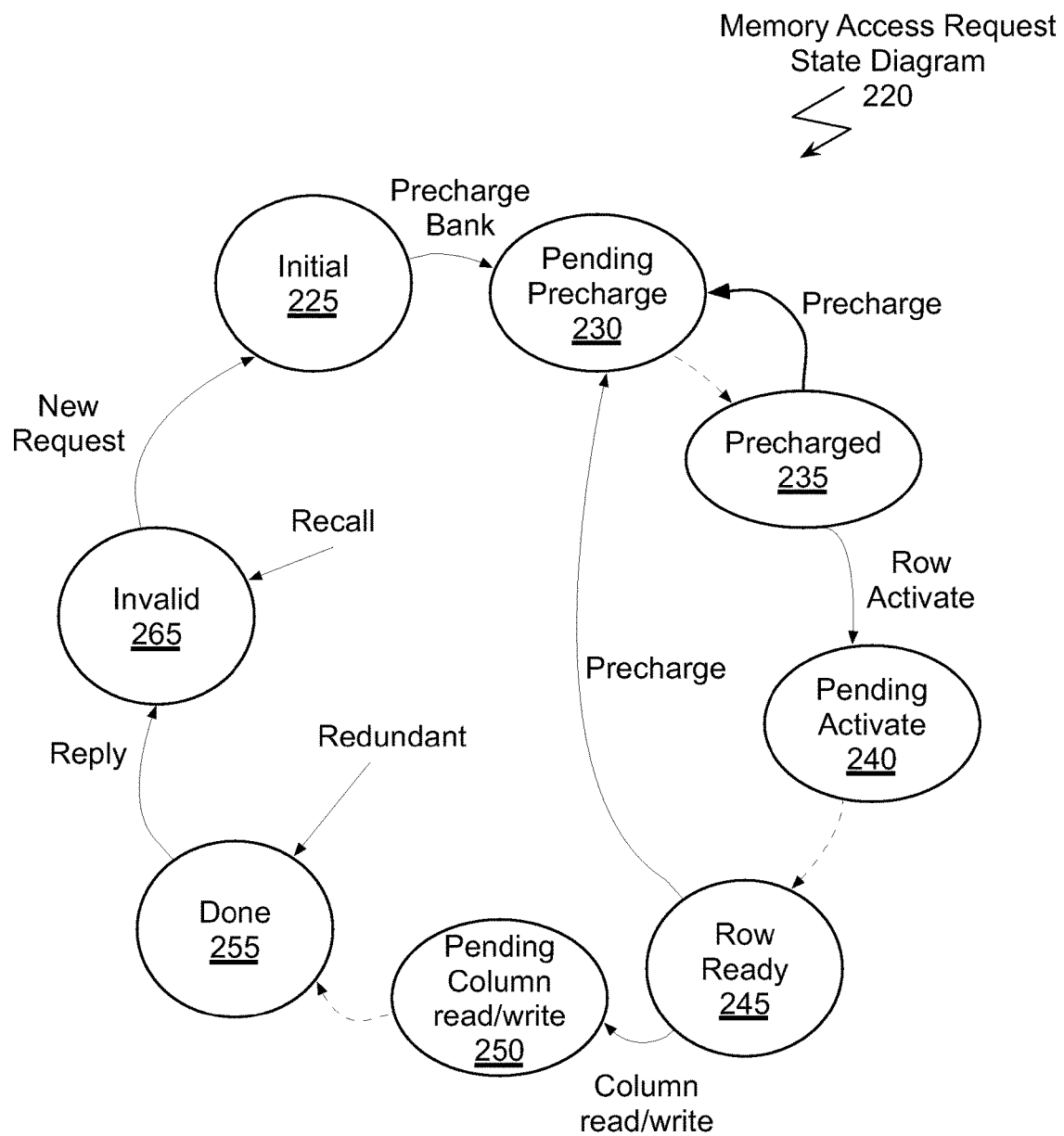
FIG. 2C illustrates memory access request state diagram, in accordance with one embodiment.

FIG. 2C illustrates memory access request state diagram 220, in accordance with one embodiment. Each memory access request stored in a pending memory access entry 200 is in one of several different states. Each clock cycle, the speculative memory controller may select an incomplete memory access request to process. As referred to herein, an incomplete memory access request is any pending memory access having a status 110 field that is not "done". Processing a memory access request requires multiple clock cycles to advance the memory access request through the different states shown in the memory access request state diagram 220. During a clock cycle, the speculative memory controller may output a command to perform one of the following memory operations: column read, column write, row activate, or bank precharge. In addition to one of these memory operations, the controller may also, in parallel, perform a reply operation to return the results of a completed memory access request to the requesting client.

Each new memory access request starts in either the initial state 225, the precharged state 235, or the row ready state 245. If, when the new memory access request is received by the speculative memory controller, the bank containing the row specified by the new memory access request is open on a different row, the new memory access request starts in the "initial" state 225. Similarly, if when the new memory access request is received by the speculative memory controller, the bank containing the row specified by the new memory access request is already precharged, the new memory access request starts in the "precharged" state 235 rather than the "initial" state 225. Finally, if when the new memory access request is received by the speculative memory controller, the new memory access request arrives and the bank specified by the new memory access request is already open to the requested row, the new memory access request starts in the "row ready" state 245.

When the speculative memory controller selects a bank to precharge that corresponds to the memory address of one or more memory access requests, the status 210 field for the memory access requests corresponding to the selected bank are updated from "initial" or "row-ready" to "precharge requested" as the pending memory access requests transition from the "initial" state 225 to the "pending precharge" state 230.

When the precharge operation is completed, the status field for all pending memory access requests corresponding to the selected bank are updated from "precharge requested" to "precharged" as the pending memory access requests transition from the "pending precharge" state 230 to the "precharged" state 235. The transition from "precharge requested" to "precharged" occurs based on the number of clock cycles needed to perform the precharge operation. Transitions that occur based on memory operation timing are shown with dashed arrows in FIG. 2C.

The speculative memory controller may select a pending memory access request corresponding to a precharged bank for processing, and then perform a row active operation to open the corresponding row for the selected memory access request. When the speculative memory access controller issues a row activate command to the memory, all pending memory access requests corresponding to the row are updated to have a status 210 field of "activate requested" as the pending memory access requests transition from the "precharged" state 235 to the "pending activate" state 240. When the activate operation is completed, all of the pending memory access requests corresponding to the row are updated to have a status 210 field of "row ready" as the pending memory access requests transition from the "pending activate" state 240 to the "row ready" state 245.

When the speculative memory controller outputs a precharge command to the memory for the selected row, the status 217 field of the bank status entry 215 for the bank that is open is updated from "open" to "pending closed". To ensure forward progress, the speculative memory controller may be configured so that for every bank that is opened, at least one column command is output before the bank is closed.

When the time 218 field for the bank indicates that the bank has been closed, the status 217 field for the bank is updated from "pending closed" to "closed". When the time 218 field for the bank indicates that the bank has been closed, the pending memory access requests with a memory address in the bank that is now closed are changed from "precharge requested" to "precharged" and enter the precharged state 235. In sum, a pending memory access request with a memory address in a bank that is open to a different row is in the "initial" state 225, a memory access request to a memory address in a bank that is closed is in the precharged state 235 and a pending memory access request with a memory address in a bank that is open to the correct row is in the row ready state 245.

The bank status entry 215 for the bank to be precharged by the precharge command that is output by the speculative memory controller to process the selected memory access request remains "closed". Once the selected bank is precharged, the speculative memory controller may output a row activate command for the selected row. Note, that the speculative memory controller may be configured to avoid issuing a memory operation command when a previous operation (e.g., precharge, activate, column read or write) is pending to the same bank. A bank precharge command may be output when a pending memory access request in the initial state 225 has a memory address in a bank that is open to a different row. The speculative memory controller may output a bank precharge command to precharge a bank when a pending memory access request is higher priority compared with all of the other pending memory access requests (if any) for the row in that bank that is open.

The speculative memory controller may be configured to select the pending memory access request having the highest priority that is in a closed bank. When multiple pending memory access requests have the same priority, a row having the largest number of pending memory access requests may be activated first. When the activate operation is output by the speculative memory controller, the status 217 field of the bank that will be opened is updated from "closed" to "pending open". The status 210 field of the selected pending memory access request is updated to "row requested". When the time 218 field indicates the row has been opened, the status for the bank is updated from "pending open" to "open". When the time 218 field indicates the row has been opened, the status 210 field of the selected pending memory access request is updated from "row requested" to "row ready".

The speculative memory controller may select a pending memory request that is in the row ready state 245 and output a column read command or a column write command to complete the selected pending memory request. Importantly, a speculative memory write request should not be selected for a column write command because such a memory access request is irreversible. When a column read command is output, a burst of data from the requested column is read and stored into the data 205 field for the selected pending memory access request and the status 210 field is updated from "row ready" to "column requested" as the selected pending memory access request transitions from the "row read" state 245 to the pending column read/write state 250. A timer is set to indicate when the column read is complete, and when the column read is complete, the status 210 field is updated from "column requested" to "done" and the selected pending memory access request transitions from the "pending column read/write" state 250 to the "done" state 255. Because the burst occupies the data pins of the memory device for several clock cycles, a reservation mask may be used to inhibit conflicting column operations during the burst.

When a column write command is output, the data 205 field for the selected pending memory access request is read, a burst of data is written to the requested column of the open row, and the status 210 field for the selected pending memory access request is updated from "row ready" to "column requested". A timer is set to indicate when the column write is complete, and, when the column write is complete, the status 210 field is updated from "column requested" to "done" and the selected pending memory access request transitions from the row ready state 245 to the done state 255. In one embodiment, row precharge operations are disallowed to rows that are involved in column read or column write operations until after the column operation is complete.

The speculative memory controller may select a pending memory access request that is non-speculative and that is in the done state 255 and output a reply command to the initiator of the now completed memory access request. The speculative memory controller outputs data for a completed memory read request and outputs an acknowledgement for a completed memory write request. Because a reply command is not output to the memory, a reply command may be output in parallel with a command that is output to the memory. Once a reply is performed for a completed memory access request, the valid 214 field is updated to False indicating that the pending memory access entry 200 is available to store a new memory access request.

In the memory access request state diagram 220, a memory access request that has the valid 214 field set to False corresponds to the invalid state 265. If a recall is received for a pending speculative memory access request stored in a pending memory access entry 200, the pending speculative memory access request transitions to the invalid state 265 and the valid 214 field for the recalled speculative memory access request is set to False. If a recalled speculative memory access request is replaced with a non-speculative memory access request, the non-speculative memory access request is stored in a pending memory access entry 200 and processed as a new pending memory access request.

Pending memory access requests may be selected "out-of-order", i.e., in a different order compared to the order in which the memory access requests are received by the speculative memory controller. However, a write request to an address may not bypass, i.e., be selected ahead of, a read request to the same address. The column write command for the write request should be output by the speculative memory controller after the column read command to complete the read request. Similarly, a read request to an address may not bypass, i.e., be selected ahead of, a write request to the same address. In other situations, a memory access request may be identified by the speculative memory controller as a redundant request. A pending memory access request that is a redundant request may transition to the done state 255 without passing through the row ready state 245. An example of a redundant request includes a pending memory access request that is a read request for the same address as a completed read request, assuming there is no intervening write request to the same address. Another example is a pending memory access request that is a read request for the same address as a completed write request, assuming there is no intervening write request to the same address. Also, a pending memory access request that is a write request to the same address as an later write request can be cancelled (and transition to the invalid state 265), assuming there is no intervening read request to the same address.

The speculative memory controller may be configured to select a pending speculative memory access request for processing and output any command except for a column write or a reply. A reply returns data to the initiator of a memory read request. Because speculative and non-speculative memory access requests may be selected, the latency incurred to validate a speculative memory access request may be hidden. For memory access requests to closed banks, or to banks open to a different row, the latency of validating speculative memory accesses may be entirely hidden due to the time required to open the bank to the addressed row. The speculative memory controller may access open banks to perform read accesses for speculative memory read requests and wait for the speculative read access request to be validated before performing the reply (or invalidate the speculative memory read request when the speculative memory read request is recalled).

Figure 3A:
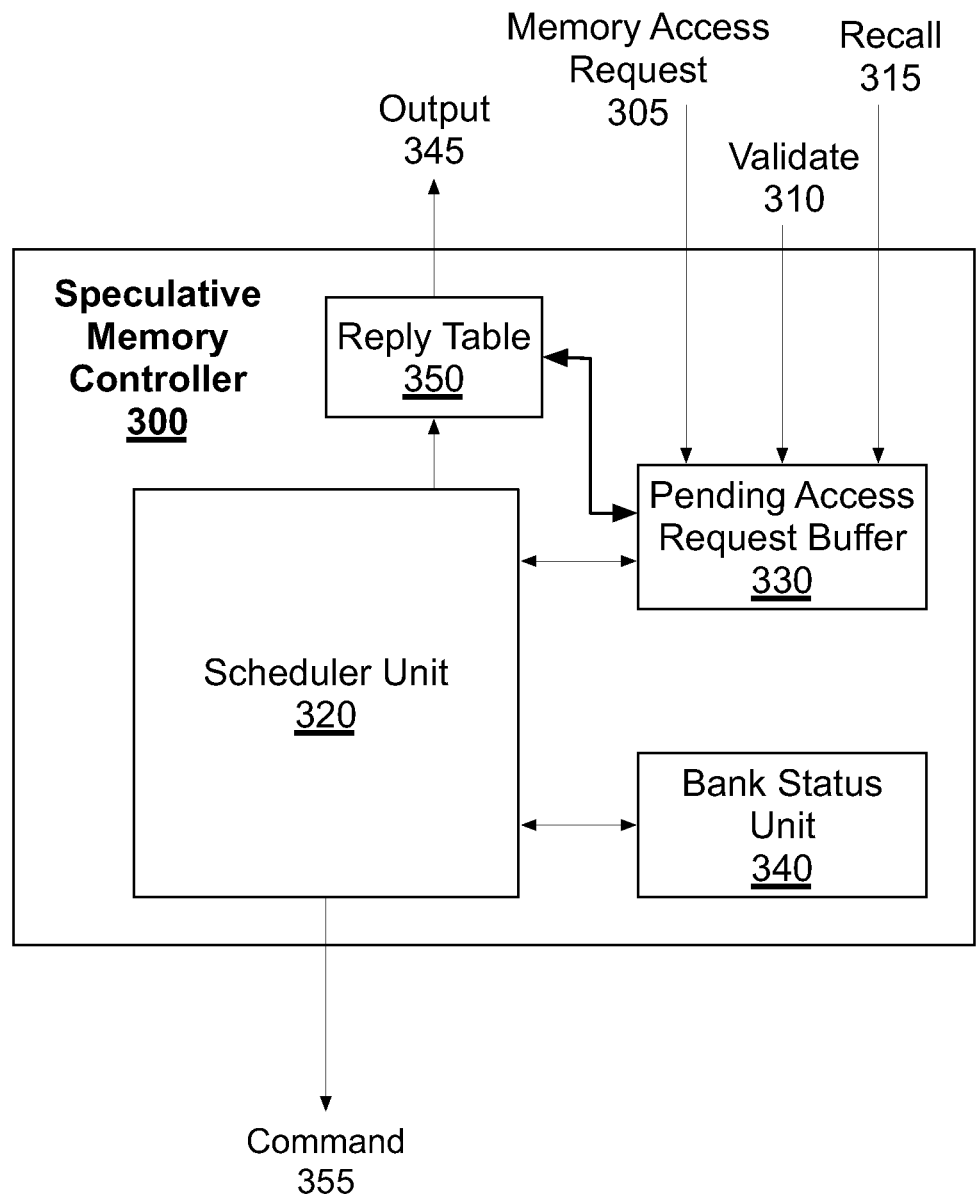
FIG. 3A illustrates a block diagram of a speculative memory controller, in accordance with one embodiment.

FIG. 3A illustrates a block diagram of a speculative memory controller 300, in accordance with one embodiment. The speculative memory controller 300 includes a scheduler unit 320, a reply table 350, a pending access request buffer 330, and a bank status unit 340. The pending access request buffer 330 stores one or more previously described pending memory access entries 200. The pending access request buffer 330 receives speculative and non-speculative memory access requests 305 as well as validate 310 and recall 315 requests for speculative memory access requests. The bank status unit 340 stores one or more previously described bank status entries 215. The reply table 350 stores entries for completed memory access requests and generates reply commands 345. The contents of the reply table 350 are described in further detail in conjunction with FIG. 3B.

The scheduler unit 320 is configured to select a pending memory access request based on bank status stored in the bank status unit 340 and the information associated with one or more memory access request that is stored in the pending access request buffer 330. On any given clock cycle, the speculative memory controller 300 may output a command 355 (e.g., precharge, activate, or column read or write) to the memory. The scheduler unit 320 is configured to select a memory access request for which a command is output from the pending memory access requests that are not complete and that are not waiting on a timer. The pending memory access request that is selected by the scheduler unit 320 may be chosen based on a priority mechanism. A priority can be calculated for each pending memory access request and the highest-priority request may be chosen by the scheduler unit 320. The priority may be a weighted function of the following terms: column first, most waiting, read first, same direction, priority, speculation, and oldest first.

To compute the column first term, the scheduler unit 320 adds a factor ColWeight to the priority of column requests (pending memory access requests that in the row ready state 245). To compute the most waiting term, the scheduler unit 320 determines the number of pending memory access requests that are waiting for the same bank to open. The most waiting term may be multiplied by a NumberWaitingWeight and added to the priority for a pending memory access request in the precharged state 235. The most waiting term gives priority to opening a bank with more waiting requests over a bank with fewer waiting requests. To compute the read first term, the scheduler unit 320 adds a ReadWeight to the priority of each pending memory read request. To compute the same direction term, the scheduler unit 320 adds a DirectionWeight factor to the priority of each pending memory access request that is in the row ready state 245 and is in the same access type (i.e., read or write) as the last column request output by the scheduler unit 320. The same direction term avoids idle cycles that may be associated with reversing the direction of the data bus of the memory interface between the memory and the speculative memory controller 300.

To compute the priority term, the scheduler unit 320 multiplies a factor PriorityWeight by the priority 206 field of each pending memory access request and adds the product to the priority computed by the scheduler unit 320 for the respective pending memory access request. Alternatively a different set of weights for each factor (PriorityWeight, ReadDirectionWeight, NumberWaitingWeight, and ColWeight) may be used for each of the four different priority levels that are stored in the priority 206 field.

To compute the Speculation term, the scheduler unit 320 subtracts a factor SpeculativeWeight from the priority 206 field of each pending speculative memory access request to reduce the priority of pending speculative memory access requests. To compute the oldest first term, the scheduler unit 320 multiplies a factor AgeWeight by the age 208 field of each pending memory access request and adds the product to the respective priority computed for each pending memory access request. Other techniques for computing a priority for each pending memory access request may use one or more of these terms or any combination of terms.

Figure 3B:
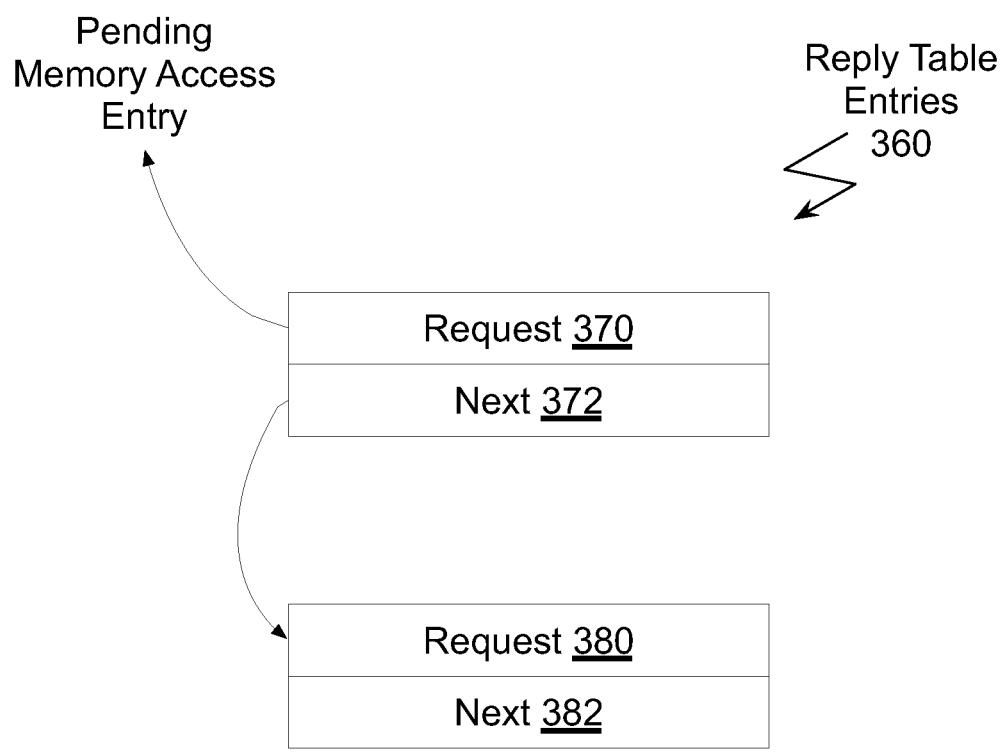
FIG. 3B illustrates reply table entries, in accordance with one embodiment.

FIG. 3B illustrates reply table entries 370, in accordance with one embodiment. The reply table 350 stores an entry for each completed memory access request, i.e., memory access requests that are in the done state 455. Each entry includes a request 370 field and a next 372 field. The request 370 field stores a pointer to the pending (now completed) memory access entry in the pending access request buffer 330. The next 372 field stores a pointer to a different entry in the reply table 350 that is associated with a redundant memory access request. The next request 380 field stores a pointer to the redundant memory access entry in the pending access request buffer. The next 382 field may store a value of null to indicate that there is no addition redundant memory access entry in the pending access request buffer. One or more redundant memory access requests may be linked to the pending memory access request entry pointed to by the request 370 field so that the speculative memory controller 300 may generate reply commands to the one or more redundant memory access requests in parallel, or at least without performing an additional memory access.

Figure 4A:
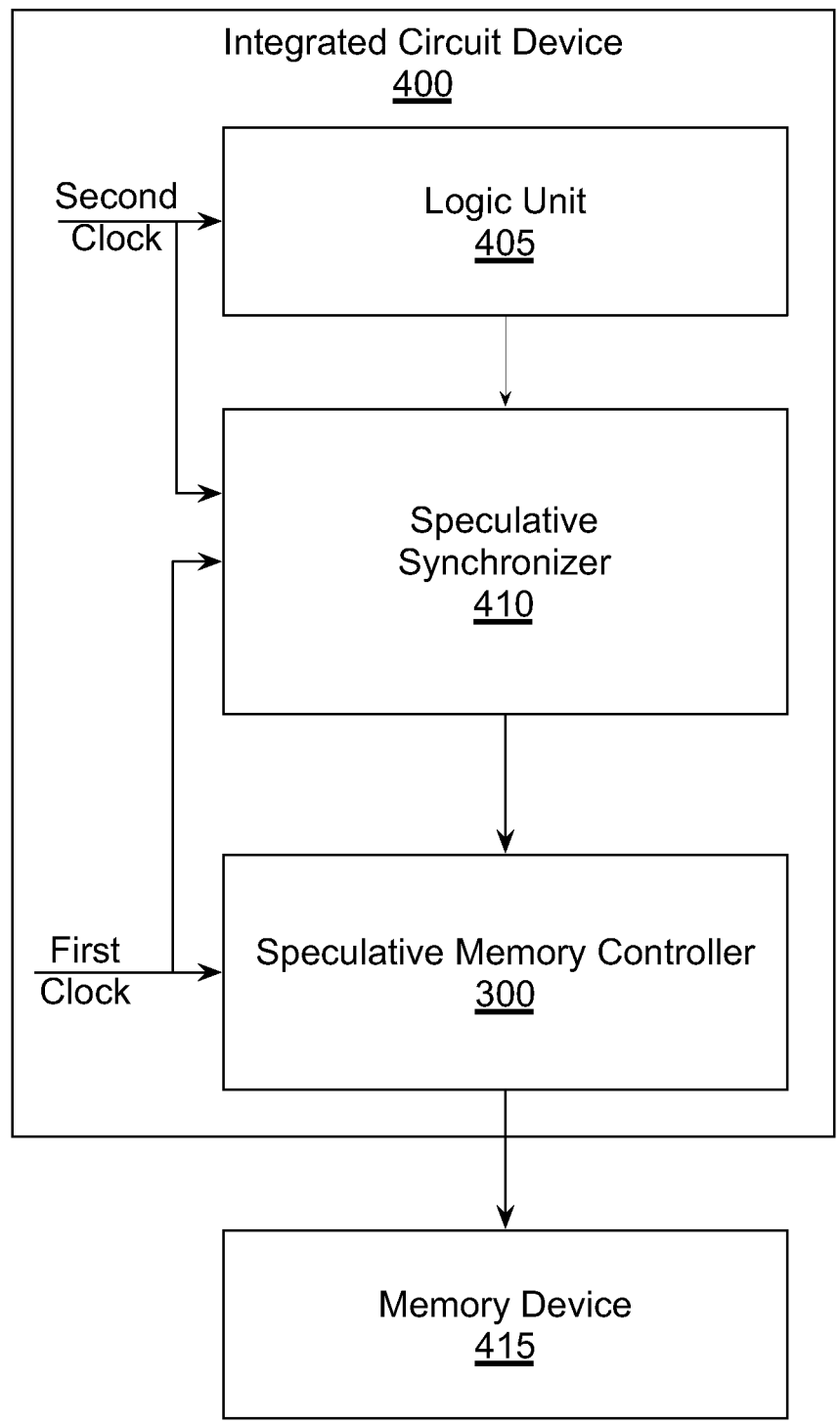
FIG. 4A illustrates a block diagram of a system including the speculative memory controller shown in FIG. 3A, in accordance with one embodiment.

FIG. 4A illustrates a block diagram of a system including the speculative memory controller 300 shown in FIG. 3A, in accordance with one embodiment. The speculative memory controller 200 may be configured to receive memory access requests from a speculative synchronizer 410 that indicates a memory access request is speculative when there is some possibility that the memory access request may have been incorrectly synchronized as the memory access requests are transmitted from a first clock domain of a logic unit 405 to a second clock domain of the speculative memory controller 300. The logic unit 405, speculative synchronizer 410, and speculative memory controller 300 may be included within an integrated circuit device 400 that is coupled to a memory device 415.

With respect to the present description, a first clock domain is a clock domain of any type of system from which a signal may be sampled. For example, the first clock domain could be a clock domain of a central processing unit (CPU), a graphics processing unit (GPU), a memory controller, and/or any other system with a clock domain. The first clock domain may include a first clock signal having a particular frequency or a frequency that may vary. A second clock domain may include a second clock signal having a particular frequency or a frequency that may vary. Signals that are transmitted from the second domain to the first domain are synchronized to the first clock domain.

Rather that using a conventional synchronizer that passes signals between clock domains using asynchronous first-in, first-out buffers (FIFOs), the speculative synchronizer 410 may be may be designed to use the relative phase between the two clock domains. An exemplary speculative synchronizer is described in patent application Ser. No. 13/688,170, titled "A Speculative Periodic Synchronizer" and filed on Nov. 28, 2012. The speculative synchronizer 410 may operate using reduced timing margins that are adequate to handle some, but not all, variation of clock periods of the first clock and the second clock. For example, the reduced timing margins may be adequate to handle timing variation during normal operation but not sufficient to handle rare cases of extreme power supply variation that produce extreme variations in the clock periods. The reduced timing margins cause the speculative synchronizer 410 to select sampled input signals having lower latency compared with a synchronizer using non-reduced timing margins. Use of the speculative synchronizer 410 is limited to cases where the output signals generated by the speculative synchronization can be recalled several cycles after the output signals are generated. For example, when the result of speculative synchronizations initiates memory read requests the requests can be cancelled or the result of the read simply ignored and no persistent state is modified. However, the result of a speculative synchronization should not be used to complete a memory write access which may irreversibly modify persistent state.

In one embodiment, the speculative synchronizer 410 may be configured to perform both an aggressive synchronization and a safe synchronization. The safe synchronization has a higher latency compared with the aggressive synchronization so that aggressively synchronized signals appear one or more cycles ahead of the signals that are safely synchronized. However, the latency incurred when a recall is needed is reduced because the safely synchronized signal can replace the recalled aggressively synchronized signals within a small number of clock cycles. Output signals that are aggressively synchronized are labeled as speculative and irreversible operations that should not be performed using the speculative output signals until the output signals are marked as non-speculative (validated). When a safely synchronized output signal is available that corresponds to a previously output speculative output signal, the safely synchronized output signal is compared to the previously output speculative output signal. If the signals match, the speculative output signal is marked as non-speculative (i.e., the speculative memory access request is validated) and the safely synchronized output signal is discarded. If the signals do not match, then the previously output speculative output signal is recalled and replaced by the safely synchronized output signal.

Figure 4B:
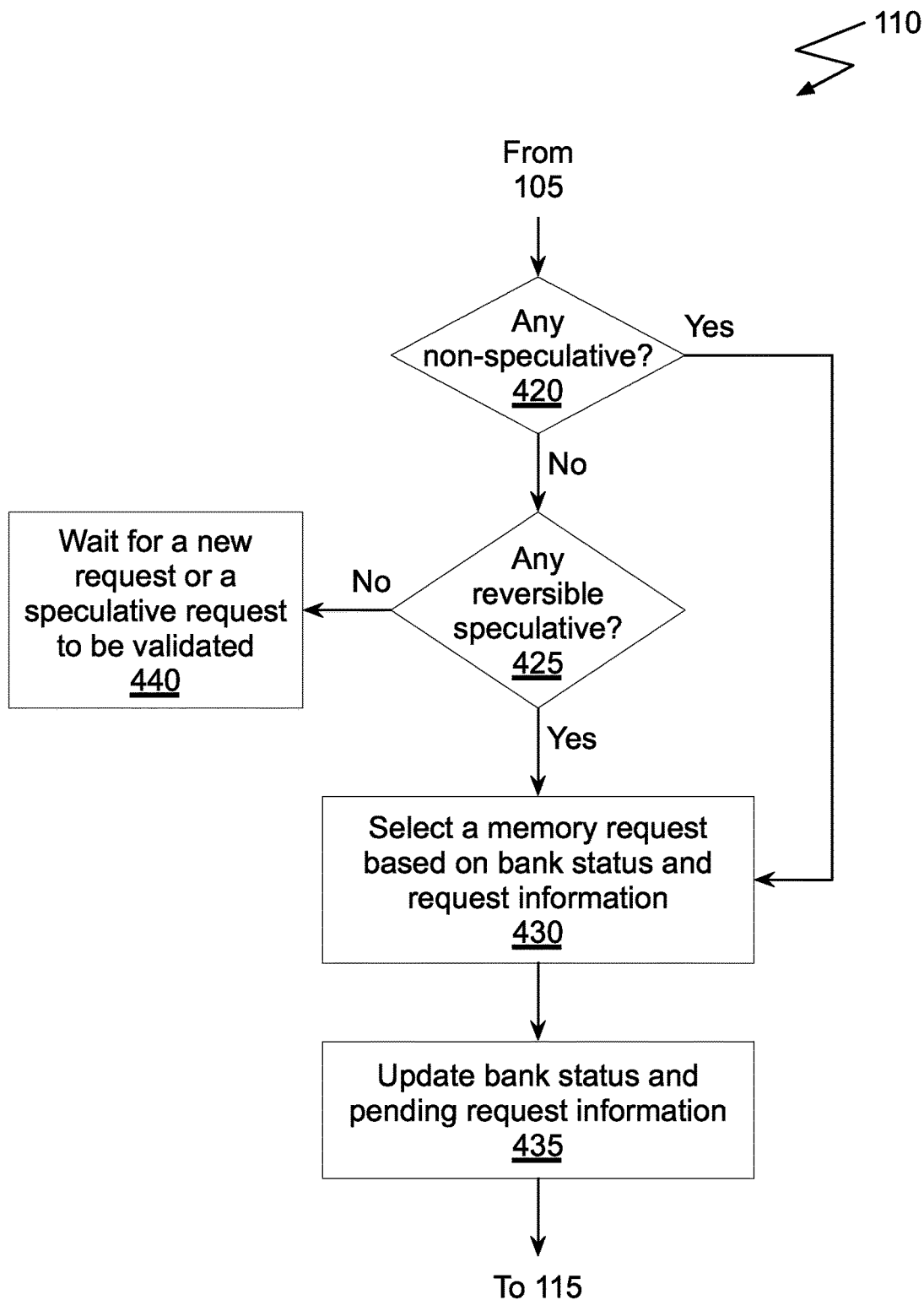
FIG. 4B illustrates a flowchart of a method for performing an operation shown in FIG. 1, in accordance with one embodiment.

FIG. 4B illustrates a flowchart for performing operation 110 shown in FIG. 1, in accordance with one embodiment. At operation 420, the speculative memory controller 300 determines if any of the pending memory access requests are non-speculative memory access requests, and, if so, at operation 430, the speculative memory controller 300 selects a non-speculative memory access request based on bank status and the information associated with one or more non-speculative memory access requests. Otherwise, at operation 425, the speculative memory controller 300 determines if any of the pending speculative memory access requests are reversible. If none of the pending speculative memory access requests are reversible, then, at operation 440, the speculative memory controller 300 waits for a new request or for a pending speculative memory access request to be validated. Otherwise, at operation 430, the speculative memory controller 300 selects a pending speculative memory access request that is reversible based on bank status and the information associated with one or more speculative memory access requests that are reversible. At operation 435, the speculative memory controller 300 updates the bank status and pending request information stored in the bank state unit 340 and the pending access request buffer 330.

Figure 5:
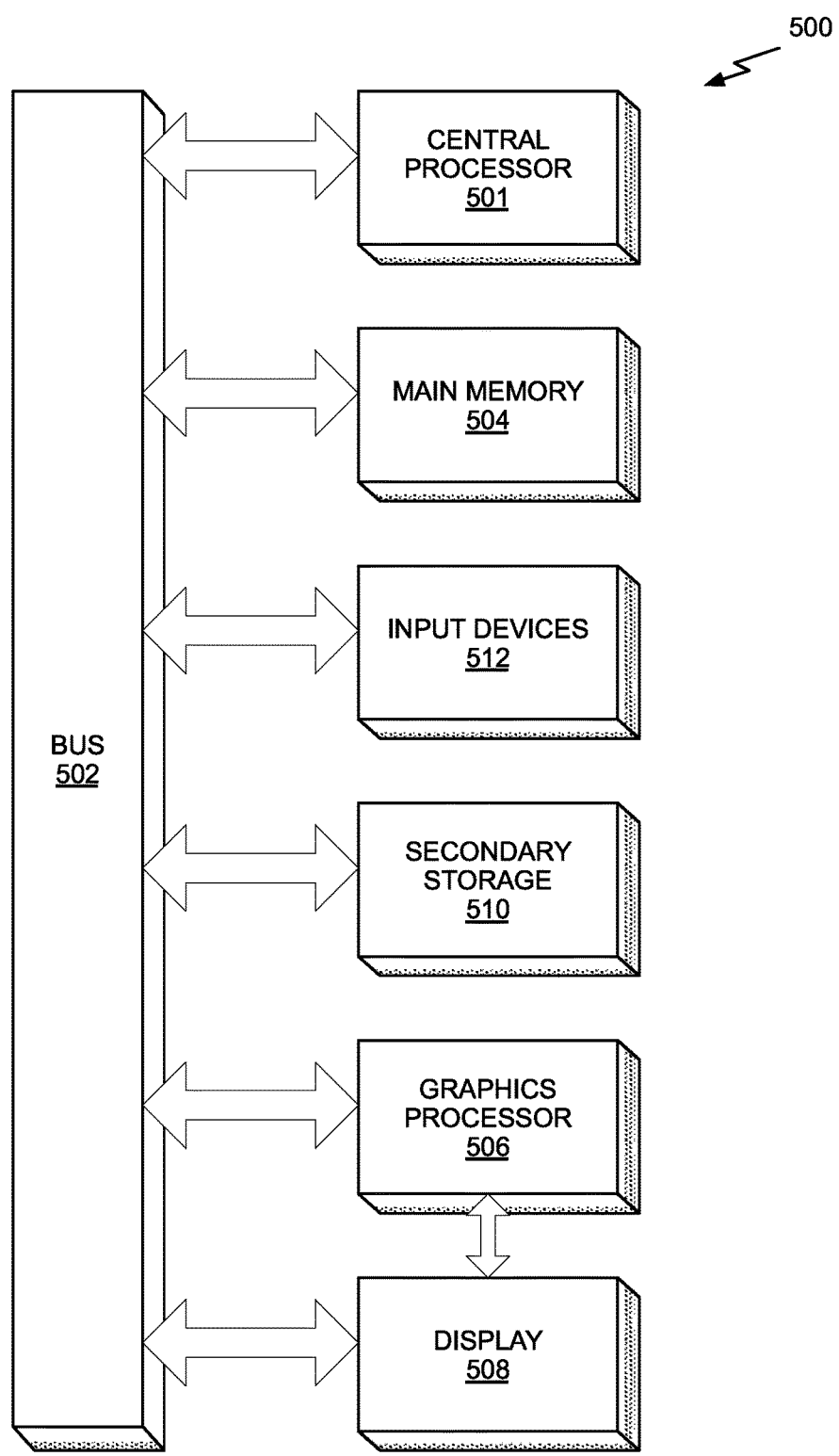
FIG. 5 illustrates an exemplary system in which the various architecture and/or functionality of the various previous embodiments may be implemented.

FIG. 5 illustrates an exemplary system 500 in which the various architecture and/or functionality of the various previous embodiments of the speculative synchronizer 410, may be implemented. As shown, the system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the integrated circuits shown in FIG. 5 may include the speculative synchronizer 410 for transmitting signals between different dock domains.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a speculative memory controller, memory access requests including at least a first speculative memory access request and a first non-speculative memory access request, wherein there is some possibility that the first non-speculative memory access request was incorrectly synchronized by a speculative synchronizer during transmission from a first clock domain to a second clock domain of the speculative memory controller and the non-speculative memory access request was correctly synchronized by the speculative synchronizer during transmission from the first clock domain to the second clock domain of the speculative memory controller;
selecting a memory access request from the memory access requests; and
generating a memory access command to process the selected memory access request.

2. The method of claim 1, further comprising:
receiving a recall request corresponding to the first speculative memory access request; and
discarding the first speculative memory access request.

3. The method of claim 1, further comprising:
receiving a validate request corresponding to the first speculative memory access request; and
indicating that the first speculative memory access request is non-speculative.

4. The method of claim 1, wherein the first non-speculative memory access request is the selected memory access request.

5. The method of claim 4, wherein the first speculative memory access request is a read request, and further comprising selecting the first speculative memory access request as a second selected memory access request.

6. The method of claim 5, further comprising waiting to return a reply to an initiator of the first speculative memory access request until the first speculative memory access request is validated.

7. The method of claim 4, further comprising generating a memory access command to advance the first speculative memory access request, wherein the memory access command is either a precharge or an activate command.

8. The method of claim 4, wherein the first speculative memory access request is a write request, and further comprising selecting the first speculative memory access request as a second selected memory access request.

9. The method of claim 8, further comprising waiting until the first speculative memory access is validated before generating a column write command to advance the first speculative memory access request.

10. The method of claim 1, further comprising returning a reply to an initiator of the selected memory access request when processing of the selected memory access request is completed.

11. The method of claim 10, further comprising:
determining that a pending memory access request is redundant with the selected memory access request; and
returning the reply to an initiator of the pending memory access request.

12. The method of claim 1, further comprising maintaining status information for each bank of a memory device that indicates whether the bank is open, closed, pending open, or pending closed.

13. The method of claim 12, wherein the selecting is performed based on the status information.

14. The method of claim 1, wherein state information that is associated with each memory access request comprises an indication of whether the memory access request is speculative or non-speculative.

15. A system comprising:
a memory device; and
a speculative memory controller configured to:
receive memory access requests including at least a first speculative memory access request and a first non-speculative memory access request, wherein there is some possibility that the first non-speculative memory access request was incorrectly synchronized by a speculative synchronizer during transmission from a first clock domain to a second clock domain of the speculative memory controller and the non-speculative memory access request was correctly synchronized by the speculative synchronizer during transmission from the first clock domain to the second clock domain of the speculative memory controller;
select a memory access request from the memory access requests; and
generate a memory access command that is output to the memory device to process the selected memory access request.

16. The system of claim 15, wherein the speculative memory controller is further configured to:
receive a recall request corresponding to the first speculative memory access request; and
discard the first speculative memory access request.

17. The system of claim 15, wherein the speculative memory controller is further configured to:
  receive a validate request corresponding to the first speculative memory access request; and
  indicate that the first speculative memory access request is non-speculative.

18. The system of claim 15, wherein the first non-speculative memory access request is the selected memory access request.

19. The system of claim 18, wherein the first speculative memory access request is a read request, and the speculative memory controller is further configured to select the first speculative memory access request as a second selected memory access request.

* * * * *